United States Patent [19]

Kraft

[11] Patent Number: 5,024,116

[45] Date of Patent: Jun. 18, 1991

[54] MODULAR ROTARY ACTUATOR

[76] Inventor: Brett W. Kraft, 11667 W. 90th St., Overland Park, Kans. 66214

[21] Appl. No.: 363,171

[22] Filed: Jun. 8, 1989

[51] Int. Cl.[5] .......................... F16H 21/44; F01B 9/00

[52] U.S. Cl. .......................................... 74/109; 92/136; 92/68

[58] Field of Search ....................... 74/109; 92/136, 68; 901/22, 25

[56] References Cited

U.S. PATENT DOCUMENTS

| | | | |
|---|---|---|---|
| 1,316,032 | 9/1919 | Hatmaker | 74/33 |
| 2,337,330 | 12/1943 | Julin | 74/29 |
| 2,844,127 | 7/1958 | Steiner | 92/136 |
| 3,156,160 | 11/1964 | Meyer et al. | 92/136 |
| 3,306,442 | 2/1967 | Devol | 209/552 |
| 3,338,140 | 8/1967 | Sheesley | 74/109 |
| 3,381,485 | 5/1968 | Crooks et al. | 405/191 |
| 3,444,784 | 5/1969 | Wengerd | 92/136 |
| 3,460,346 | 8/1969 | Branson | 60/54.5 |
| 3,722,711 | 3/1973 | Seidel | 214/1 BD |
| 3,837,764 | 9/1974 | Fritch et al. | 417/62 |
| 4,134,306 | 1/1979 | Grotness et al. | 74/29 |
| 4,164,810 | 8/1979 | Sipek et al. | 29/568 |
| 4,295,794 | 10/1981 | Cain | 417/62 |
| 4,561,592 | 12/1985 | Fender et al. | 74/109 X |
| 4,648,782 | 3/1987 | Kraft | 414/735 |
| 4,794,847 | 1/1989 | Kreuter et al. | 74/109 X |

FOREIGN PATENT DOCUMENTS

| | | | |
|---|---|---|---|
| 852537 | 8/1981 | U.S.S.R. | 901/25 |

*Primary Examiner*—Leslie A. Braun
*Assistant Examiner*—Khoi Q. Ta
*Attorney, Agent, or Firm*—Litman, McMahon & Brown

[57] ABSTRACT

A rotary actuator includes a plurality of interchangeable and essentially identical modular drive units each having a pair of racks operably rotating a drive shaft such that the torque applied to the shaft is evenly divided between the drive units. The shaft has pinion-type teeth of a length to accommodate the number of drive units needed to develop the required shaft torque. End plates sandwich the drive units therebetween and rotatably support the shafts. An internal channel system routes hydraulic fluid simultaneously to the proper ends of the racks of each of the drive units to translate the racks in unison. A position sensor identifies the rotary position of the shaft and provides such information to the control mechanism. A rack biasing mechanism for each rack provides biasing pressure against an associated back of a rack directly opposite the shaft and includes a roller acting on the back of the rack. A differential pressure sensor arrangement is provided to sense rotary loading of the shaft.

24 Claims, 3 Drawing Sheets

Fig.4.
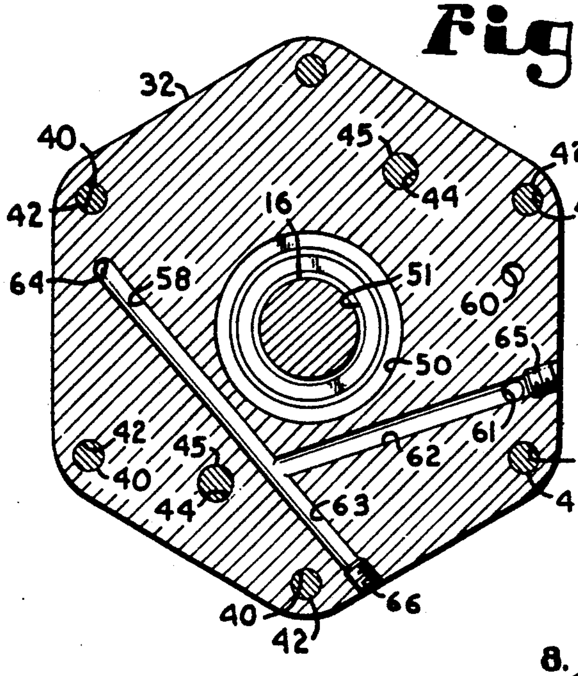
Fig.9.
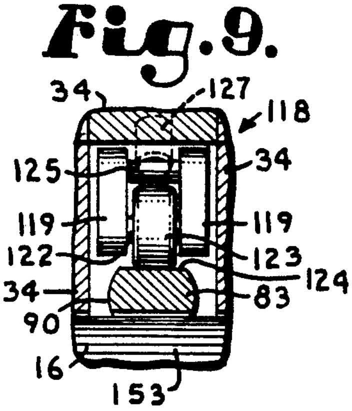
Fig.5.
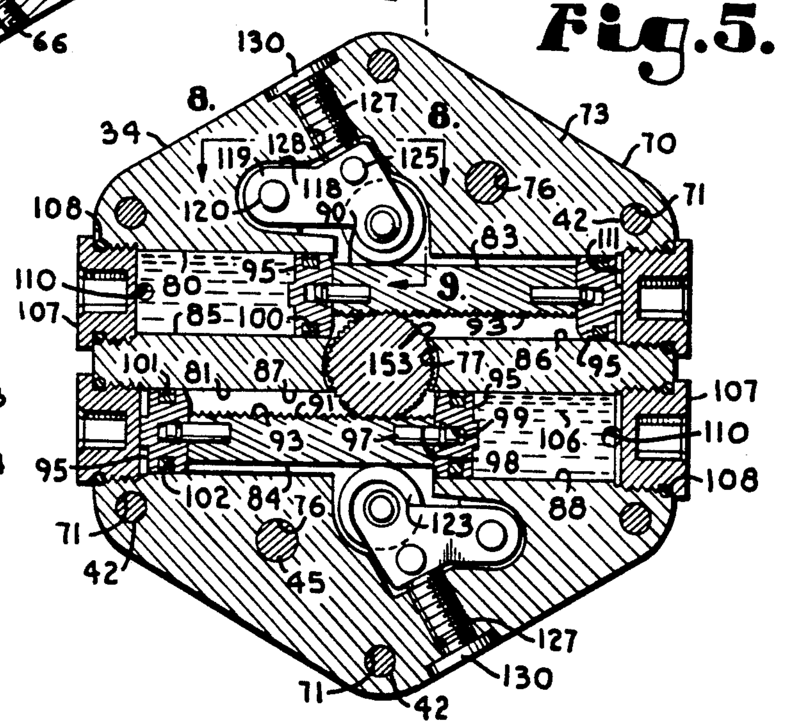
Fig.8.
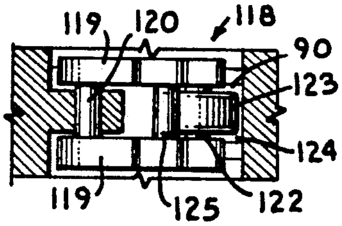
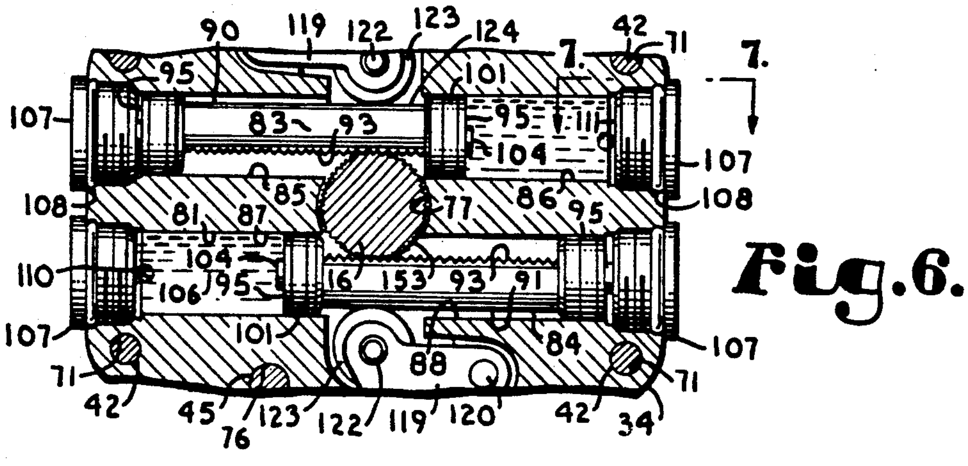
Fig.6.

MODULAR ROTARY ACTUATOR

BACKGROUND OF THE INVENTION

The present invention relates to devices for mechanically rotating objects and, in particular, to a modular hydraulically controlled rotary actuator.

Rotary actuators are utilized for a wide range of services wherein it is desirable to selectively rotate one mechanical structure relative to another. For example, actuators of this type are frequently used in the field of robotics to rotate a robotic arm to a preselected angular orientation relative to another part of the robot with a relatively high degree of accuracy.

Rack and pinion type actuators, wherein a slidable and linearly movable rack drives a pinion gear which effectively operates as a rotary drive, have been popular and are used in many different types of equipment. Such rack and pinion actuators have many desirable characteristics which include a relatively high mechanical efficiency, low internal hydraulic leakage which allows the actuator to be hydrostatically locked, tolerance for relatively heavy radial and axial shaft loading due to the ability to use relatively large bearings and the availability of a large variety of seals and materials of construction.

The major disadvantage of conventional rack and pinion type rotary actuators is that a cylinder barrel, or the like, is required for providing a pathway within which the racks must travel and this barrel must extend generally outward from a tangent of the pinion gear. Such cylinder barrels are relatively small for actuators requiring only a relatively small torque to be applied to the pinion gear. However, as the torque applied to the pinion gear increases, the length of the cylinder barrel must also increase.

In particular, the conventional method of increasing the torque applied to a pinion gear is to increase the force applied by a single rack acting on the pinion gear or by a pair of opposed racks acting upon the single pinion gear. However, this force cannot be substantially increased beyond a given degree without major modification of the device. That is, as the maximum torque required to be transmitted to the pinion gear increases, the gear teeth must be increased in size to keep the teeth from being broken from the gear.

However, when the teeth are increased in size, in order to allow the teeth to mesh smoothly to provide for a smooth rolling action, the diametral pitch of the pinion gear must be increased in size also. Effectively, this means that the pinion gear must have a substantially larger diameter than is required for a similar pinion gear transmitting a substantially lower torque. Since the teeth are much larger and further spaced on a larger gear as compared to a smaller gear, the rack must also be proportionately larger as the travel of the rack required to move the pinion gear through a particular angular movement is generally proportional to the diameter of the gear. Consequently, the cylinder barrel for the conventional devices must be much longer for a device transmitting a larger torque than for such a device operating under a lower torque.

Often when a mechanical design calls for a rotary actuator of the type disclosed herein, there is sufficient space available in order to allow extension of the actuator axially but not radially or laterally. Consequently, it is desirable to be able to use axial extension to increase the torque output of such an actuator without substantially increasing the radial extension of the actuator, but this option has not been available in the prior art.

Further, the prior art has failed to provide a rotary actuator of the type described herein which can be easily modified with interchangeable modules to generate the required torque for a particular installation. It is usually desirable to have the overall size of the actuator as small as possible; therefore, it is desirable to have such an actuator that can be sized upward for increased maximum torque in incremental and preferably in stages that increase maximum torque by a generally standard and known amount for each stage or module acting upon a drive shaft.

Prior art actuators normally are available in many sizes to produce various torques, but very few parts of such actuators are interchangeable; therefore, it is further desirable that torque generating modules for the rotary actuators be constructed of the same interchangeable parts and that the modules can simply be added together in a laminated fashion to act upon a single pinion gear or shaft having elongate teeth extending axially therealong and being sized for the number of modules required for the particular installation. Such a device allows the torque to be applied to a single pinion gear or shaft to be spread out along teeth that are substantially elongated and can withstand higher torques when such torques are divided into individual component forces acting upon sections of the teeth.

It is still further desirable to have an actuator of this type wherein the racks move with relatively little internal friction which substantially improves the mechanical efficiency of the device.

SUMMARY OF THE INVENTION

A modular rotary actuator includes a plurality of interchangeable rack drive units or modules each of such drive modules operably applying a torque to pinion gears on a drive shaft. The number of drive modules is selected in accordance with the maximum torque to be applied to the pinion gears. Where the maximum torque is to be high, a number of drive modules are necessary and where the torque is to be low, only a single drive module may be required. The drive shaft has a toothed pinion gear-like region that is sized in length to extend through the number of drive modules required to provide the maximum torque needed for the particular job for which the actuator is intended.

Each of the drive modules preferably includes a pair of opposed racks which are slidably mounted within bores through a housing for each of the drive modules. Each of the racks is connected at opposite ends thereof to a respective piston which sealably and slidably moves within the bore associated with the rack. Hydraulic fluid is communicated to the side of each piston opposite the connection of the piston to an associated rack such that the piston can be operatively driven toward the rack by the fluid. With selective control of the hydraulic fluid by a controlling mechanism that can be manually or computer operated, the pistons can be driven to any operational position along the bore so as to consequently linearly drive the rack to a particular position which, in turn, rotates the pinion gear-like portion of the shaft.

One of the pistons associated with each rack drives the shaft in a clockwise rotation and the other drives the shaft in a counterclockwise rotation. Each of the pistons that drive the shaft in a clockwise position are associated with hydraulic fluid channels which are commonly linked throughout the actuator with like pistons in each drive module. Likewise, the pistons that drive the shaft in a counterclockwise position also are associated with fluid channels which are interconnected so as to commonly provide hydraulic fluid to all such pistons, within the actuator simultaneously. In this manner, the force exerted by the hydraulic fluid to urge rotation of the shaft to a desired position is divided into generally equal components applied by each drive module to the shaft and having a total rotary force or torque associated therewith which is approximately equal to the combined torques applied to the total number of pistons acting to rotate the pinion gear in a particular direction.

A common channel within the actuator is provided to interconnect hydraulic fluid acting against each of the pistons to rotate the shaft in a particular direction.

The actuator includes a pair of end plates. Each of the drive modules is effectively interchangeable and identical with the others and as many or as few modules as are required may be sandwiched between the end plates in a side by side and laminated manner with substantially the only variance required of the actuator being that the pinion gear-like portion of the shaft be sized so as to accommodate and extend through the entire stacked set of drive modules to be used and that the bolts holding the overall structure together be sized to take into account the number of drive modules to be used.

The shaft is rotatably supported within bearings mounted in each of the end plates. A position sensor is attached to the shaft and operationally senses the rotary position of the shaft. The sensor preferably transmits information concerning the relative position of the shaft to a controller mechanism so as to provide for automatic or remote manual control of the position of the shaft by means of controlling the hydraulic fluid operationally pressurized against one of the sets of pistons in accordance with the direction in which it is desired to rotate the shaft.

The racks each include teeth on one side thereof and have a planar back on the opposite side. A biasing mechanism includes a roller that is effectively biased against the back of the rack directly opposite the pinion-like portion of the shaft (that is, the roller engages and pushes the rack toward the shaft and the pinion-like portion of the shaft along a common radius extension Of both). The roller provides a relatively low friction means of exerting force to maintain the rack and pinion gear-like portion of the shaft in a meshed relationship when force is applied to translate the rack or to rotate the shaft. The roller includes means to allow for adjustment of the pressure exerted against the rack. In addition, the rack pistons are not directly attached to the rack but are axially connected through a pin that allows the rack pistons to keep the ends of the rack in proper alignment.

The rack pistons also include a relatively low friction seal. The seal prevents any substantial leakage of the hydraulic fluid about the piston and allows the piston to be effectively "locked" in position once an equilibrium state is reached in the hydraulic fluid acting against the pistons on each side of each rack, so that the actuator does not significantly creep even under load.

OBJECTS OF THE INVENTION

The objects of the present invention are: to provide a rotary actuator that is readily adaptable to be varied for different maximum torque requirements without being oversized; to provide such an actuator including modular units that can be stacked in side by side relationship in the proper number required to provide for the amount of maximum torque required for a particular use of the actuator; to provide such modular units which are aligned axially along a shaft associated with the actuator; to provide such a modular unit including a pair of opposed racks that operatively act upon teeth along the shaft; to provide such an actuator wherein the various racks are driven by paired pistons, one such piston operably driving the shaft in a clockwise rotation and the opposite driving the shaft in a counterclockwise rotation; to provide such an actuator wherein all of the pistons driving the shaft in a particular rotary direction are simultaneously driven by hydraulic fluid from a common source such that the force applied against the piston by the hydraulic fluid in total is effectively subdivided and applied to each of the pistons in accordance with the number of pistons; to provide such an apparatus including internal channels for interconnecting hydraulic fluid flows to associated pistons; to provide such an apparatus including end plates supporting bearings for rotatably mounting the shaft; to provide such an apparatus wherein the racks are biased toward the teeth of the shaft by rollers; to provide such an apparatus wherein biasing pressure applied to the racks by such rollers is effectively adjustable; to provide such an actuator wherein the racks and pistons have a relatively high mechanical efficiency and relatively low frictional loss during movement; to provide such an apparatus wherein the hydraulic fluid utilized to motivate the pistons is effectively maintained within a fluid system with relatively very little internal leakage, thereby allowing the actuator to be substantially hydrostatically locked in a particular position once fluid pressure acting against pistons on opposite sides of the racks becomes equalized; to provide such an actuator adapted to withstand relatively high radial and axial shaft loading; to provide such an actuator wherein component parts for various interchangeable modules are also readily interchangeable; to provide such an actuator having combinable standardized parts such that actuators adapted to apply maximum torques of substantially any operable level can be manufactured from generally the same parts with the exception of shaft length and bolts utilized to connect the various parts together without substantially oversizing of the actuator; to provide such an actuator utilizing combinable modules to allow substantial variance in the torque applied by the actuator, yet wherein the actuator does not substantially increase in radial dimensions with the addition of modules or with the increased ability of the actuator overall to provide substantially greater torques; to provide such an actuator which can be easily adapted to mount on various structures; and to provide such an actuator which is relatively easy to build, economical to construct, and which is particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged and cross-sectional view of an end plate of the actuator, taken along line 4—4 of FIG. 2.

FIG. 5 is an enlarged and cross-sectional view of a module of the actuator, taken along line 5—5 of FIG. 2, and shows details of the rack and pinion of a drive unit.

FIG. 6 is a further enlarged fragmentary cross-sectional view of a module of the actuator similar to FIG. 5.

FIG. 8 is an enlarged, fragmentary and cross-sectional view of a roller mechanism of the actuator, taken along line 8—8 of FIG. 5.

FIG. 9 is an enlarged, fragmentary and cross-sectional view of the roller mechanism of the actuator, taken along line 9—9 of 5.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
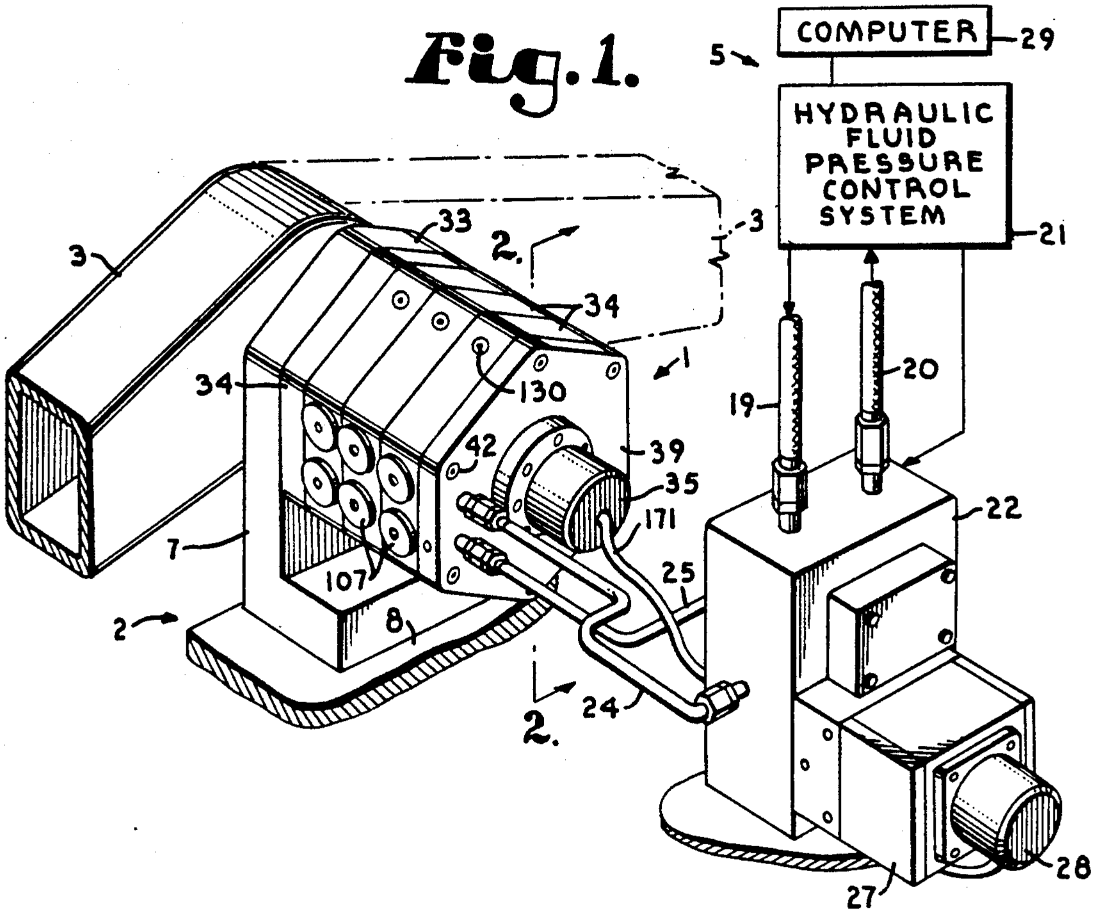
FIG. 1 is a perspective and partially schematic view of an actuator in accordance with the present invention shown in conjunction with a mounting structure, a rotatable arm, and a hydraulic fluid control mechanism.

A rotary actuator for the present invention is generally designated by the reference numeral 1. As seen in FIG. 1, the actuator 1 is mounted on a support structure 2, rotates a tool or other mechanism such as the illustrated arm 3 and is operably controlled by a hydraulic supply pressure control system 5.

The support structure 2 may be any suitable device for supporting and preventing relative rotation of the actuator 1 with respect thereto. In the illustrated embodiment, the support structure 2 is illustrated as an L-shaped member 7 attached to a planar surface 8. The actuator 1 includes a plurality of threaded apertures 10 extending through a front face 11 thereof and that receive bolts or the like (not shown) passing through the support structure 2 to secure the actuator 1 to the support structure 2. It is foreseen that many suitable devices could be used to support the actuator 1 and that these devices could also be attached to other locations on the body of the actuator 1.

For example, when used with certain types of robotics, it may be preferable to have the support structure 2 attached to the side of the actuator 1 and it is foreseen that suitable mounting means may be utilized for this purpose, such as threaded apertures along the side of the actuator 1. It is further noted that the actuator 1 in accordance with the present embodiment has a generally hexagonal section, although a circular cross-section or other type of cross-section may also be utilized.

The arm 3 may be any structure or mechanism requiring selective rotation through a controllable arc by the actuator 1 or rotated about a desired axis. The arm 3 is secured to a splined segment 15 of a central rotary shaft 16 of the actuator 1. In this manner, rotation of the shaft 16 rotates the arm 3 about the axis of the shaft 16 through the same arc as the shaft 16. The arm 3 is shown in a first position in solid lines in FIG. 1 and in a second rotated position in phantom lines in FIG. 1.

The hydraulic supply and pressure control system 5 includes hydraulic supply and return conduits, hoses or lines 19 and 20 through which hydraulic fluid is supplied from a conventional hydraulic fluid pressure control system 21 or the like which includes a hydraulic pump and reservoir (not shown). The supply lines 19 and 20 are connected to a reversible hydraulic valve 22 which, in turn, communicates the hydraulic fluid to hydraulic fluid conduits, hoses or lines 24 and 25 respectively.

Actuation of the valve 22 in one direction pressurizes line 24 and, in turn, urges rotation of the shaft 16 and, consequently, the arm 3 in a counterclockwise rotation. Reversal of the valve 22 in the opposite direction urges operable rotation of the arm 3 in a clockwise direction. Placing the valve 22 in a neutral position, hydrostatically locks the shaft 16 and arm 3 in position.

The valve 22 includes rotary load sensing means or a pressure differential sensing mechanism 27 operably connected to the fluid in lines 24 and 25 to sense the differential pressure between the fluids therein. The sensing mechanism 27 includes a differential pressure transmitter device 28 for operably transmitting a signal representing the pressure differential sensed by the mechanism 27 to a control device such as a computer 29 for sensing loading of the shaft 16, that is, resistance to rotation of the shaft. Such information is useful in a feedback control system which may be employed for controlling the operation of the actuator 1.

Hydraulic control systems, such as system 21, for flow connecting with lines 19 and 20 and for generating and controlling hydraulic fluid under pressure by manual control are well known in the art.

The actuator 1 comprises a first end plate 32, a second end plate 33 receiving in sandwiched or laminated relationship therebetween a plurality of modular drive units 34, the drive shaft 16 operably rotated by the drive units 34, and position sensing means such as the illustrated position sensor 35.

Referring to FIG. 4, the illustrated end plate 32 is hexagonally shaped and has an inner surface 38 and an outer rear surface 39. The end plate 32 and surfaces 38 and 39 have six circumferentially spaced and axially aligned threaded apertures 40 passing therethrough, each for receiving a respective bolt 42. The bolts 42 also pass through the modular units 34 and the end plate 33 parallel to the shaft 16, as described below so as to secure the actuator 1 snugly together when assembled.

Figures 3, 7:
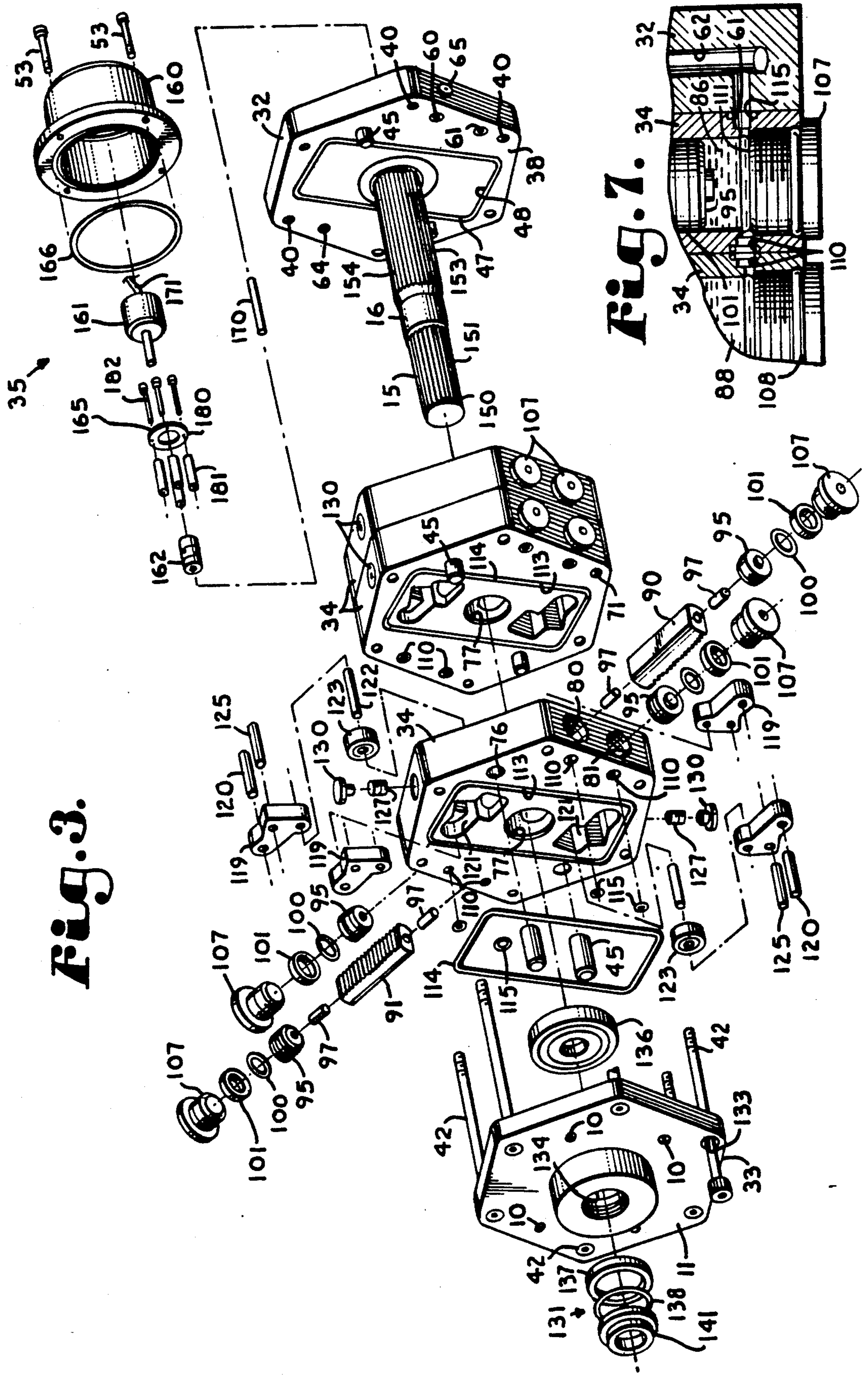
FIG. 3 is an enlarged exploded perspective view of the actuator.
FIG. 7 is an enlarged, fragmentary and cross-sectional view of the actuator, taken along line 7—7 of FIG. 6.

Extending partially through the end plate 32 and parallel to the axis of the shaft 16 is a pair of apertures 44 snugly receiving therein a pair of outward extending alignment studs 45. As seen in FIG. 3, the end plate 32 also includes on the inner surface 38 a generally rectangularly shaped continuous groove 47 receiving therein a sealing O-ring 48.

Figure 2:
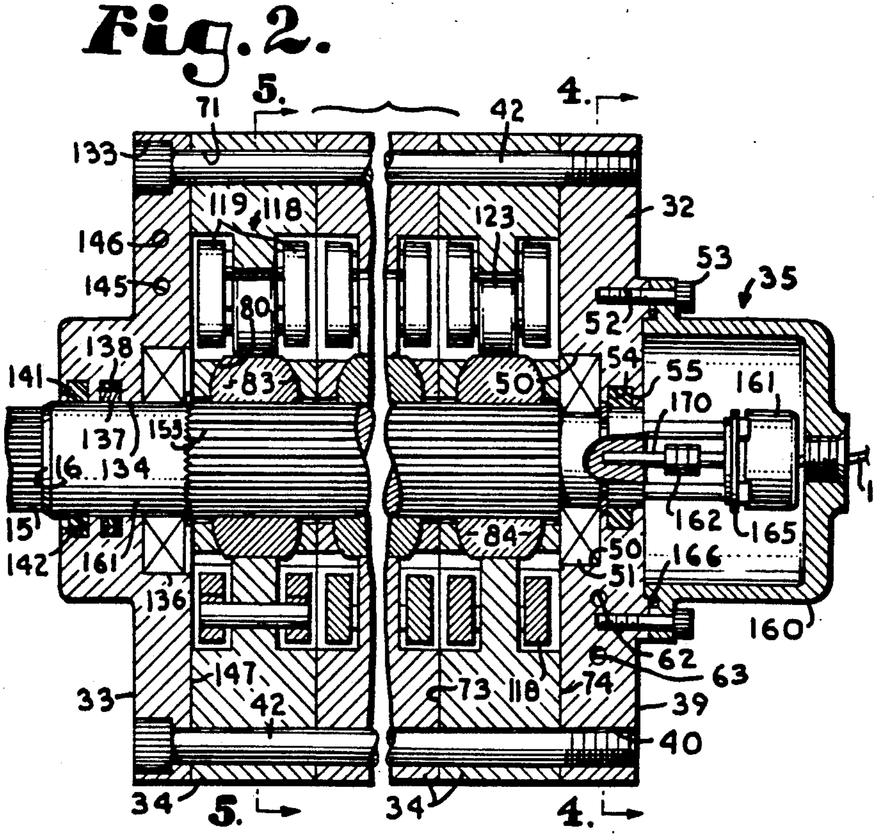
FIG. 2 is an enlarged, fragmentary longitudinal sectional view of the actuator, taken along line 2—2 of FIG. 1.

Axially aligned and centrally positioned within the end plate 32 is a bore 50. Received within the bore 50 is a bearing 51 for rotatably mounting one end of the shaft 16. The end plate 32 also includes on the rear surface 39 thereof a plurality of apertures 52 (FIG. 2) receiving bolts 53 for mounting the position sensor 35 securely thereto. Extending radially outward from the bore 50 rearward (that is, to the right as shown in FIG. 2) of the bearing 51 is a groove 54 receiving a seal 55. The seal 55 operably seals between the shaft 16 and the end plate 32 to prevent contamination from entering into the internal portions of the actuator 1 therebetween.

The first end plate 32 includes an internal hydraulic fluid channel system 58 (FIG. 4) for operably directing the flow of hydraulic fluid from the hydraulic lines 24 and 25 to the modular units 34. The channel system 58 includes a first passage 60 flow connected to the hydraulic line 24 and passing parallel to the axis of the shaft 16 completely through the plate 32. The system 58 also includes a second passage 61 flow connected to the hydraulic line 25 and also extending completely through the plate 32 parallel to the axis of the shaft 16.

The passage 61 flow interconnects with a first cross bore 62 which subsequently flow interconnects with a second cross bore 63 that, in turn, near a distal end thereof, connects with a passage 64 extending from the bore 63 to the interior surface 38 of the end plate 32. External ends of the cross bores 62 and 63 are closed with plugs 65 and 66 respectively. The cross bores 62 and 63 are positioned internal of the plate 32 and aligned generally parallel to the end plate inner and outer surfaces 38 and 39.

The embodiment illustrated in FIGS. 1 through 9 includes three modular drive units 34. Each of the drive units 34 is interchangeable and essentially identical. The drive units 34 are laminated or stacked together side by side, and the shaft 16 is rotatably mounted through each modular unit 34 in such a manner such that the modular drive units 34 commonly rotate the shaft 16, as described below, and so as to generally equally distribute to each of the modular units 34 one-third of the overall torque to be applied to the drive shaft 16.

Referring to FIG. 5, each of the modules 34 includes a hexagonal shaped body or housing 70. Each body includes a plurality of circumferentially spaced apertures 71 aligned parallel to the axis of the shaft 16 (axially aligned) and sized and positioned so as to receive the bolts 42 therethrough when the actuator is assembled. Each housing 70 has opposite internal faces 73 and 74 (FIG. 2) that are generally planar and parallel. Each face 73 and 74 includes a pair of apertures 76 sized and positioned so as to align with apertures 76 of adjacent bodies 70 and with apertures 44 in end plates 32 and 33 such that the studs 45 when mounted therein bridge therebetween and positively align the end plates 32 and 33 with the modular units 34, as well as the modular units with one another. A centrally located and axially aligned bore 77 extends through each of the modular drive unit housings 70 and is sized to rotatably receive the shaft 16.

A pair of parallel channels 80 and 81 extend generally between opposite sides of each housing 70 generally parallel to but spaced from and between the faces 73 and 74. The channels 80 and 81 receive toothed linear gear drive mechanisms or rack assemblies 83 and 84 respectively. The channel 80 includes a first bore portion 85 and a coaxially aligned second bore portion 86. Likewise, the channel 81 has a first bore portion 87 and a coaxially aligned second bore portion 88.

A rack member 90 extends between the bore portions 85 and 86 of the channel 80 and a second rack 91 extends between bore portions 87 and 88 of the channel 81. Each of the racks 90 and 91 is elongated and includes a series of gear teeth 93 positioned therealong in spaced facing relationship to one another.

Opposite ends of the racks 90 and 91 are connected to respective pistons 95. The pistons 95 are slidably and sealably received within a respective channel bore portion 85, 86, 87 and 88. The pistons 95 associated with a particular rack 90 or 91 are connected thereto by pins 97 axially received in bores 98 in the racks 90 and 91 and bores 99 in the pistons 95 respectively.

Each of the pistons 95 includes sealing means that in the illustrated embodiment comprises an O-ring 100 and a sleeve 101 received in a circumferential groove 102 on each piston 95. Each O-ring 100 is preferably of a resilient rubber or plastic and biases outwardly when a respective piston 95 is in one of the channels 80 and 81. The sleeve 101 is preferably constructed of a low friction material such as tetrafluoroethylene (sold under the trademark Teflon) and is biased into sliding and sealing relationship with a respective channel 80 or 81 by the underlying O-ring 100.

Each of the pistons 95 includes a nub or spacer 104 (FIG. 6) of substantially thinner diameter than the remainder of the piston and extending axially from the side of the piston opposite the rack 90 or 91 associated therewith. Received in the channel bore portions 85, 86, 87 and 88 outward from respective pistons 95 is hydraulic fluid 106. Each of the bore portions 85, 86, 87 and 88 includes a plug 107 threadably positioned therein whereat same intersect with the outer exterior of a respective housing 70. The plugs 107 each have associated therewith O-ring seals 108 to operably seal between the associated channels 80 and 81 and the exterior of the actuator 1.

Four bores 110 extend between the housing faces 73 and 74 parallel to the axis of the shaft 16 and are positioned to intersect with respective bore portions 85, 86, 87 and 88 of channels 80 and 81 between the maximum extension of the pistons 95 (such as is seen with respect to the top piston 95 to the right in FIG. 5 and such as is shown in FIG. 7) and the plugs 107. The spacers 104 on the pistons 95 ensure that the pistons 95 will be sufficiently spaced from the plugs 107 so as to allow a cavity 111 to be formed between the pistons 95 and the plugs 107 to flow communicate with the bores 110.

An internal hydraulic flow system for the actuator 1 includes the bores 110. In particular, as viewed in FIG. 3, the bores 110 of each of the modules 34 are also aligned such that each upper right bore 110 coaxially aligns with the aperture 60 in the end plate 32 as well as with a corresponding aperture in the end plate 33. Each lower right bore 110 is coaxially aligned with the aperture 61 in the end plate 32. Likewise, each upper left bore 110 is coaxially aligned with passage 64 in the end plate 32. Finally, the lower left bores 110 are coaxially aligned with each other and so as to communicate with a passage in the end plate 33.

Each of the body faces 73 includes a groove 113 (FIG. 3) for receiving a sealing ring 114 therein. Smaller O-rings 115 are also positioned to surround and align with the bores 110 on each side thereof. When the modular units 34 and end plates 32 and 33 are in abutting and snug relationship with one another, the seals 114, 115, and 48 seal between each adjacent modular unit 34 or end plate 32 and 33 to prevent external contamination from entering the interior of the actuator 1 and to prevent hydraulic fluid from leaking about the bores 110.

Associated with each of the racks 90 and 91 is a biasing mechanism 118 (FIG. 9). Each biasing mechanism 118 includes a pair of rocker arms 119 pivotally mounted in the drive unit housing 70 by a pivot pin 120 and located in an open receiver or slot 121 extending between the housing faces 73 and 74. Opposite and spaced from each pivot pin 120 is an axle 122 extending between associated rocker arms 119. Rotatably mounted on each axle 122 is a biasing wheel or roller 123 that is urged into biasing relation against a rear surface 124 of a respective rack 90 or 91 opposite the teeth 93 thereof. The biasing roller 123 of each biasing mechanism 118 is positioned to bias against the associated rack 90 or 91 directly opposite the shaft 16 along an extended radius thereof. A connecting pin 125 extends between each pair of rocker arms 119 in spaced relationship to the pivot pin 120 and axle 122 opposite the roller 123. A compressing set screw 127 is threadably mounted in the housing 70 so as to engage each respective pin 125 such that a respective loading or compression can be placed on each pin 125 and, consequently, upon each biasing roller 123 against an associated rack 90 or 91. Threaded bores 128 for the set screws 127 are sealably closed by covers 130.

The end plate 33 is in many respects a mirror image of the end plate 32. The major exceptions are that the end plate 33 includes a front sealing assembly 131 (FIG. 3) and the interconnecting hydraulic fluid channels therein are positioned differently as compared to the end plate 32. In particular, the end plate 33 includes countersunk bores 133 (FIG. 2) for receiving heads of the bolts 42 in a recessed manner therethrough. The end plate 33 includes a central bore 134 for slidably receiving the shaft 16. Mounted in the bore 134 is a journal bearing 136 for the shaft 16, an intermediate seal including a sleeve 137 and an O-ring 138 received in a groove 139, and a front seal 141 received in a groove 142 radially extending into the end plate 33 from the bore 134.

A pair of cross bores 145 and 146 communciate with one another and extend through the interior of the end plate 33 parallel to an internal face 147 of the end plate 33. The cross bores 145 and 146 function similar to the cross bores 62 and 63 of the end plate 32. However, the cross bores 145 and 146 communicate with a different set of the bores 110 of the drive units 34 as compared to cross bores 62 and 63. In particular, the cross bores 145 and 146 flow communicate with the upper right and lower left bores 110 of the drive modules 34 (as viewed in FIG. 3) such that the cross bores 145 and 146 effectively communicate flow of hydraulic fluid between the upper right bores 110 (again as seen in FIG. 3) with the lower left bore 110. In this manner, relatively pressurized hydraulic fluid is communicated simultaneously from the hydraulic line 24 with each of the pistons 95 acting to drive an associated rack 90 or 91 in a direction to urge the drive shaft 16 to rotate in a counterclockwise direction, while relatively pressurized hydraulic fluid from hydraulic line 25 (as compared to pressure in line 24) is operably simultaneously conveyed to the appropriate pistons 95 to urge such pistons 95 to drive the racks 90 and 91 to rotate the drive shaft 16 in a clockwise rotation.

The drive shaft 16 is an elongated generally cylindrical shaft extending between the end plates 32 and 33. The shaft 16 is operably and rotatably supported by the bearings 51 and 136 near opposite ends thereof. The splined segment 15 extends outwardly from the end plate 33 and includes an outward extension 150 of the shaft 16. A plurality of elongate and parallel splines or teeth 151 are positioned on the extension 150 and extend completely thereabout for connecting to the arm 3. Between the end plates 32 and 33 the shaft 16 has a series of elongated pinion teeth 153 extending entirely thereabout in evenly spaced and parallel relationship. The teeth 153 extend along the cylindrical surface of the shaft 16 generally parallel to the axis of the shaft 16. The teeth 153 function as pinion gear teeth and combine to form a pinion gear 154 adapted to engage each of the racks 90 and 91. The racks 90 and 91 of each module 34 are positioned so as to be in facing and opposed relationship with respect to one another while engaging the pinion gear 154.

Although in the present embodiment the teeth 153 are continuous along the shaft 16 in the region of the pinion gear 154, it is foreseen that discrete sets of teeth could be formed for each pair of racks 90 and 91 associated with a particular module 3. Likewise, although the teeth 153 are shown to be integral with the shaft 16, the teeth could be positioned on a separate gear sleeved about the shaft 16 and secured thereto by locking pins or the like.

The position sensor 35 comprises a cover 160 (FIGS. 2 and 3), a sensing element 161 and a connector 162. The cover 160 surrounds the sensing unit 161 when secured to the end plate 32 by the bolts 53. A seal 166 seals between the cover 160 and the end plate 32. Frictionally mounted in the shaft 45 and extending axially and rearwardly therefrom is a pin 170 that is joined by the connector 162 to the sensor 161. The sensor 161 is a conventional rotary position sensor, which may be resistive, digital, or the like, and is adapted to sense the angular position of the shaft 16 and transmit that position through a wire 171 to the computer 29. A support assembly 165 for the sensor 161 includes a hub 180 and four legs 181 secured to the hub 180 and to the end plate 32 by respective bolts 182 passing through the hub 180 and the legs 181.

In use, the modular rotary actuator of the present invention is preferably provided as a kit having a plurality of modular drive units 34, end plates 32 and 33 with a position sensor 35 attached to the end plate 32 and a plurality of rotary shafts such as the shaft 16 and fastening means such as sets of the illustrated connector bolts 42 sized to extend between various combinations of modular drive units 34 and the end plates 32 and 33. The shafts are sized to accommodate from one modular drive unit 34 in incremental steps up to the maximum number of modular drive units 34 available in the kit. Likewise, the sets of bolts 42 are similarly sized in incremental lengths or steps to accommodate the various combinations of modular drive units 34 up to the maximum number available.

For a particular usage, the actuator 1 is assembled such as is shown in illustrations 1 through 9, having in this example three modular drive units 34. The actuator 1 is, as shown in FIG. 1, attached to a support structure 2 and an arm. Likewise, actuator 1 is connected to a control mechanism 5 to provide hydraulic pressure under control of an operator, the computer 29 or the like to the actuator 1 through hydraulic lines 24 and 25. When hydraulic fluid is urged to flow into and through the line 24 and a like amount is withdrawn from the line 25, the actuator 1 is urged to drive the shaft 16 in a counterclockwise direction which, in turn, rotates the arm 3 in a counterclockwise direction to a selected position. In particular, sufficient hydraulic fluid is effectively pumped into the channel bore portions 86 and 87 to urge the pistons 95 therein against the racks 90 and 91 to effectively move the racks 90 and 91 to the desired locations such as to rotate the shaft 16 through a required angular movement to position the arm 3 where desired.

Withdrawal of the hydraulic fluid from the bore regions or portions 86 and 87 and flow of the fluid into the opposed bore portions or regions 85 and 88, reverses the operation of the device, and the arm 3 consequently rotates in a clockwise direction to a desired position. The sensor 35 senses the rotary position of the arm 3 through the shaft 16 and conveys this information to a remote location for use by an operator or the computer 29 in controlling the actuator 1.

Figure 10:
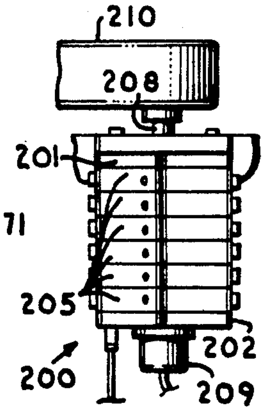
FIG. 10 is a top plan view of a modified embodiment of the actuator in accordance with the present invention having six drive modules.

Illustrated in FIG. 10 is an alternative embodiment of the actuator in accordance with the present invention generally designated by the reference numeral 200. The actuator 200 is quite similar to the actuator 1 and includes the same modular components.

In particular, the actuator 200 includes end plates 201 and 202 which are essentially identical to end plates 32 and 33 of the previous embodiment. The actuator includes six modular drive units 205 with each unit 205 being essentially identical to the modular drive units 34 of the previous embodiment. The actuator 200 includes a shaft 208 passing through each of the drive units 205 and being driven thereby in the manner equivalent to manipulation of the shaft 16 of the previous embodiment. Attached to the shaft 208 is a position sensor 209 similar to the position sensor 35 and an arm or other tool 210 to be operably rotated by the shaft 208.

In general, the actuator 200 is essentially identical to the actuator 1 except that it includes twice as many modular drive units 205 and that the shaft 208 and bolts holding the actuator 200 together are proportionately longer than corresponding structures in the previous embodiment. The actuators 1 and 200 may be constructed from the same kit using the same end plates and at least some of the same modular drive units. In comparison, where the modular units 205 of actuator 200 are essentially identical to the modular drive units 34 of actuator 1, the actuator 200 can apply approximately twice as much torque to the arm 210 as the actuator 1 can apply to the arm 3.

It is to be understood that while certain forms of the present invention have been illustrated and described herein, it is not to be limited to the specific forms or arrangement of parts described and shown.

What is claimed and desired to be secured by Letters Patent is as follows:

1. A rotary actuator comprising:

(a) an elongate drive shaft having pinion gear teeth mounted thereon and an axis of rotation; said shaft being adapted to join with and rotate a tool; and (b) a plurality of modular and interchangeable drive units positioned axially along said shaft; each of said drive units including at least one fluid actuated member having drive teeth thereon mating with said shaft gear teeth so as to operably rotate said shaft when each of said drive units is activated; each of said drive units including aligned axial ports and interconnecting conduits to operably provide for actuating fluid to be simultaneously transferred among said drive units such that each of said members is simultaneously selectably actuated to rotate said drive shaft about the axis of rotation thereof in a common direction.

2. The actuator according to claim 1 wherein:

(a) each of said drive units include a rack; said drive shaft extending through said drive units and being operably rotated by said racks so as to rotate said shaft.

3. The actuator according to claim 1 wherein:

(a) said modular units being positioned along said shaft in side by side relationship to each other; and (b) each of said modular units includes a pair of opposed racks.

4. The actuator according to claim 2 wherein:

(a) said racks are hydraulically positioned by hydraulic control means; and (b) hydraulic fluid to motivate said racks is delivered to each of said racks from a common source so as to be simultaneously delivered to each of said modular units so as to drive racks of each of said modular units to rotate said drive shaft in a common direction and apply an equal torque from each of said racks to said shaft.

5. The actuator according to claim 4 wherein:

(a) each of said modular drive units includes channel means operably conveying fluid for actuating said drive units therein; said channel means being positioned such that channel means of adjacent modular units align and flow communicate with one another to allow said fluid to cooperatively rotate said shaft in a selected common direction during operation.

6. In a rotary hydraulic actuator having an elongate drive shaft, the improvement comprising:

(a) a plurality of interchangeable modular drive units axially positioned along said shaft in side by side relationship; each of said drive units including a fluid actuated member operably engaged with and selectively rotating said drive shaft; each of said fluid actuated members of all of said drive units being respectively fluid flow linked to each other so as to simultaneously drive said shaft in a common rotational direction.

7. A rotary actuator comprising:

(a) an elongate drive shaft having an axis of rotation and having pinion gear-like teeth extending along a cylindrical surface portion thereof parallel to said axis;

(b) a first end plate and a second end plate positioned in spaced relationship to each other and rotatably supporting said shaft;

(c) a plurality of modular drive units; each of said drive units having a hydraulically driven rack positioned therein; each of said racks being positioned so as to mesh with the pinion gear-like teeth of said shaft; said modular drive units being sandwiched between said first and second end plates; and (d) hydraulic means simultaneously communicating pressurized hydraulic fluid to said racks so as to urge translation of said racks in unison to thereby rotate said shaft.

8. The actuator according to claim 7 wherein:

(a) each of said modular units includes a pair of opposed racks; each rack having pistons at opposite ends thereof operably driven by hydraulic fluid.

9. The actuator according to claim 7 wherein:

(a) said shaft is selected from a set of shafts with one of each of said shafts in said set being sized to receive different numbers of said modular drive units.

10. The actuator according to claim 7 wherein:
(a) each of said modular drive units is sized to have a preselected maximum torque generating capacity; and
(b) each of said modular drive units is drivingly connected to said shaft such that the maximum torque generating capacity of said shaft is the combined maximum torque generating capacity of all of said modular drive units.

11. The actuator according to claim 10 wherein:
(a) said gear-like teeth on said shaft are sufficiently elongated to simultaneously engage the racks of all of the modular drive units.

12. The actuator according to claim 7 wherein:
(a) said actuator includes a hydraulic flow channel therethrough; said hydraulic flow channel including interconnect segments in each of said modular drive units for simultaneously communicating hydraulic fluid to drive racks in each of said modular drive units so as to rotate said shaft in a common direction.

13. The actuator according to claim 12 wherein:
(a) each of the end plates include hydraulic fluid channel segments flow communicating with said modular drive unit hydraulic fluid flow segments.

14. The actuator according to claim 12 wherein:
(a) each of said modular units includes a first set of racks and a second set of opposed racks positioned on opposite sides of said shaft; and
(b) said hydraulic flow channel includes flow means internal of said actuator interconnecting fluid acting on one side of said first set of racks with the opposite side of said second set of racks.

15. The actuator according to claim 7 including:
(a) position sensing means operably connected to said shaft.

16. The actuator according to claim 7 including:
(a) rotary load sensing means operatively sensing resistance to rotation of said shaft.

17. The actuator according to claim 7 wherein:
(a) each of said racks includes a rack biasing mechanism; each of said rack biasing mechanisms including a biasing wheel operably positioned against a back surface of said rack directly opposite and aligned with a radius of said shaft; said biasing mechanism including biasing means for urging said biasing wheel against the back surface of an associated rack.

18. In a rotary actuator wherein a rack acts upon a pinion gear to operably rotate the gear, the improvement comprising:
(a) a biasing mechanism for biasing said rack against said pinion gear with a minimum of translational friction; said biasing mechanism comprising a roller mounted so as to engage a back surface of said rack directly opposite said pinion gear such that a radius of said roller is generally colinear with a radius of said gear and a rocker arm, said roller being pivotally mounted on said rocker arm near one end thereof and an opposite end of said rocker arm being pivotally mounted by a pivot to said actuator; sad biasing mechanism also including biasing means engaging said rocker arm intermediate said pivot and said roller for selectively adjusting the force applied by said roller to said rack and operably urging said roller against said rack.

19. The actuator according to claim 18 wherein:
(a) said rack is positioned within a bore in said actuator and includes a respective piston at opposite ends thereof; each of said pistons adapted to be translated in a channel with said rack; said rack being connected to each of said pistons by a pin; said pin being axially positioned within said rack so as to prevent relative movement of said rack with respect to said pistons perpendicular to an axis of travel of said rack.

20. A rotary actuator comprising:
(a) an elongated shaft having an axis of rotation; and
(b) at least two fluid actuated modular drive units stacked axially in side by side relationship along said shaft; said drive shaft extending between said drive units and said drive units operably drivingly engaging said shaft to selectively rotate same; said drive units having channels therethrough for flow of fluid for actuating said drive units and each of said drive units having axial ports aligned with adjacent drive units to allow flow of the fluid simultaneously therethrough.

21. The actuator according to claim 20 wherein:
(a) said shaft includes pinion teeth thereon aligned parallel to said axis of rotation; and
(b) each of said drive units includes a rack meshed with said teeth and operably translatable to rotate said shaft; each of said drive units generating a uniform torque during operation and being interconnected so as to act in unison upon said shaft such that the torque applied to said shaft is a combination of the torques generated by all of said racks.

22. The actuator according to claim 21 wherein:
(a) said racks are hydraulically driven.

23. An actuator kit including:
(a) a plurality of interchangeable and essentially identical drive modules each adapted to output a predetermined maximum torque; each of said modules including a hydraulically drivable rack with gear teeth thereon;
(b) a set of shafts; each of said shafts having teeth thereon adapted to mesh with said rack teeth; each of said shafts having the teeth thereof extending therealong for respective different lengths so as to accommodate different combinations of said drive modules thereon;
(c) a first end plate;
(d) a second end plate; said first and second end plates being sized and shaped to rotatably individually support each one said shafts and to sandwich said drive modules therebetween; and
(e) fastening means for securing said first and second end plates and any selected number of said drive modules together.

24. A rotary actuator comprising:
(a) an elongate drive shaft having a spline and a pinion gear portion; said gear portion having gear teeth extending along a surface thereof generally parallel to an axis of rotation of said shaft;
(b) a first end plate having a centrally located opening therethrough and including bearing means mounted in said opening for supporting said shaft; said spline extending outward from one side of said end plate and said gear portion extending in an opposite direction;

(c) a plurality of modular drive units; each of said drive units having a pair of opposed hydraulically driven racks mounted therein; each of said racks being positioned in a respective bore within a respective drive unit; each of said drive units having connected to opposite ends thereof a pair of drive pistons; said shaft extending through a central bore in each of said drive units; each of said racks being mounted so as to have rack teeth thereof engage the shaft gear teeth in a meshed relationship; each of said modular drive units including hydraulic fluid channel means for operably conveying hydraulic fluid to said pistons on a side of said pistons opposite an associated rack; said channel means for each of said modular units being interconnected such that hydraulic fluid acting on a first set of pistons commonly biases said racks to rotate said shaft clockwise and hydraulic fluid acting on a second set of pistons commonly biases said rack to rotate said shaft counterclockwise;

(d) each of said racks having associated therewith a biasing mechanism; each biasing mechanism including a roller pivotally mounted in a respective drive module and engaging a back surface of said rack directly opposite said shaft; said biasing mechanism including adjustable biasing means for urging this roller against respective rack back surface; and (e) a second end plate positioned opposite said first end plate and including a central opening therethrough and bearing means mounted in said opening for supporting said shaft; said first end plate and said second end plate sandwiching said modular drive units therebetween.

* * * * *